J. F. O'CONNOR.
FRICTION SHOCK ABSORBING MECHANISM.
APPLICATION FILED NOV. 15, 1919.
1,374,674.
Patented Apr. 12, 1921.
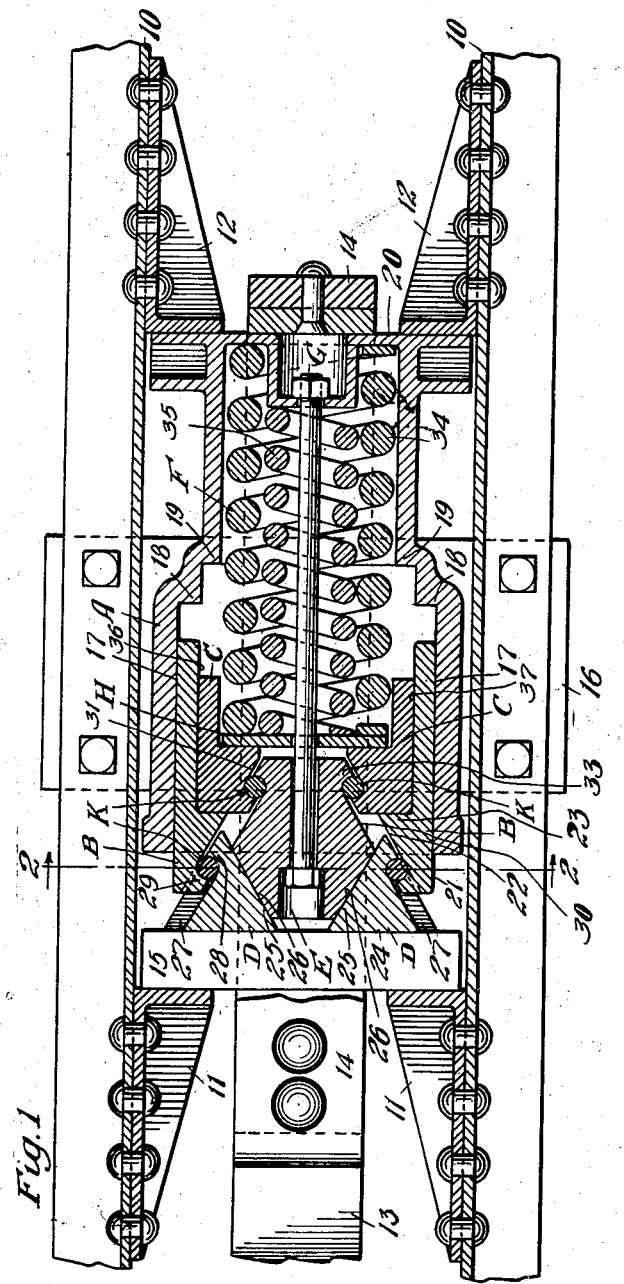
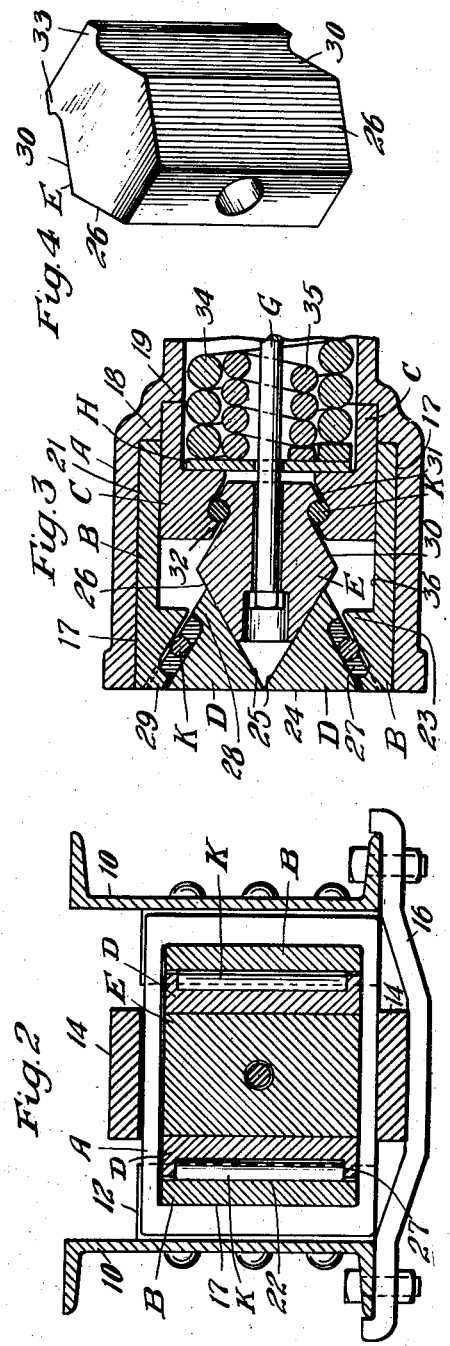
Witnesses
Wm. Geiger
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,374,674. Specification of Letters Patent. Patented Apr. 12, 1921.

Application filed November 15, 1919. Serial No. 338,182.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of the invention is to provide a graduated high capacity friction shock absorbing mechanism especially adapted for railway draft gears and wherein is obtained certain release.

Another and more specific object of the invention is to provide a friction mechanism of the character described wherein are employed two sets of friction shoes with coöperating spreading devices, one set of friction shoes remaining stationary during a part of the compressive stroke and the other set movable relatively thereto.

In the drawing forming a part of this specification, Figure 1 is a horizontal longitudinal sectional view of a portion of a railway draft rigging, showing my improvements in connection therewith. Fig. 2 is a vertical transverse sectional view taken substantially on the line 2—2 of Fig. 1. Fig. 3 is a broken sectional view corresponding to Fig. 1 but illustrating the position assumed by the movable elements of the mechanism at the end of the compressive stroke. And Fig. 4 is a perspective view of the wedge block employed with my improvements.

In said drawing, 10—10 denote channel shaped center or draft sills of a railway car to the inner faces of which are secured front stops 11 and rear stops 12 of any desirable form and spaced standard distances apart. A portion of a draw-bar is indicated at 13, the same being operatively connected to the shock absorbing mechanism proper by means of a yoke 14 of usual form. The shock absorbing mechanism proper, hereinafter described, is mounted within the yoke as is also a front follower 15. The various movable parts are supported by any suitable means such as the detachable saddle plate 16.

The shock absorbing mechanism proper, as shown, comprises, broadly, a combined friction shell and spring cage casting A, an outer pair of friction shoes B—B, an inner pair of friction shoes C—C, an outer pair of wedges D—D, a central wedge block E, a main spring resistance F, a retaining bolt G, a spring cap or washer H, and anti-friction rollers K—K interposed between the shoes and the various wedges.

The casting A, as shown, is provided at its outer end with a friction shell proper, the same being substantially rectangular in cross section and having interior parallel side friction faces 17—17. At the rear end of said friction faces 17, the shell is provided with inwardly projecting shoulders 18—18 to limit the inward movement of the outer friction shoes B—B, as hereinafter explained. Rearwardly of the shoulders 18, the shell is provided with additional inwardly extended limiting shoulders 19—19 for the inner pair of shoes C, as hereinafter explained. At its rear end, the casting A is formed with an integral wall and lateral extensions, as indicated at 20 so as to adapt the rear end of the casting to act as a rear follower for the mechanism.

Each of the outer friction shoes B is provided with an outer flat friction face 21 which coöperates with the corresponding friction shell face 17. On its inner side, each shoe B is also provided with a wedge face 22, the same being inclined rearwardly and toward the axis of the mechanism. Shoulders 23 are formed at the inner ends of the wedge faces 22 to limit the outward movement of the inner friction shoes C with respect to the shoes B, as will be apparent from an inspection of Fig. 1.

Each of the wedges D is preferably of equilateral triangular cross section horizontally so as to provide an outer friction surface 24 coöperable with the follower 15, and an inner friction surface 25 coöperable with the opposed friction surface 26 on the outer end of the block E. Grooves 27 are formed in the sides of the wedges D to receive the outer set of anti-friction rollers K, the wedges D and shoes B being provided also with shoulders 28 and 29 to limit the movements of the rollers K with respect to said members.

The wedge block E, in addition to its outer wedge surfaces 26 which diverge rearwardly, is provided with an inner pair of rearwardly converged wedge faces 30—30 opposed to the corresponding wedge faces 31—31 on the inner sides of the friction shoes C. The shoes C and block E are provided with shoulders 32 and 33 to retain the rear pair of anti-friction rollers K in proper position.

The wedge block E is centrally perforated to accommodate the bolt G as is also the spring cap or plate H, the ends of said bolt G being retained by the block E at one end and by the rear wall of the casting A at its other end, as clearly appears from Fig. 1.

The spring F, as shown, comprises an outer heavy coil 34 and an inner lighter coil 35, said spring bearing at its rear end against the rear wall of the casting A and at its forward end against the cap H, which in turn bears against inwardly extended shoulders of the shoes C so that movement of the latter is yieldingly resisted by the spring F.

The shoes C are made appreciably shorter than the shoes B for a purpose hereinafter described and the shoes B are provided with interior friction surfaces 36 parallel to the surfaces 17 and coöperable with opposed friction surfaces 37 on the outer sides of the shoes C.

The operation of the mechanism is as follows: Assuming an inward movement of the drawbar, the front follower 15 will be forced rearwardly and during the first part of the compressive stroke, the wedges D, block E, shoes B and shoes C will travel rearwardly substantially as a unit against the action of the spring F and until the shoes B come into engagement with the shoulders 18. During this part of the stroke, it is evident that friction will be generated between the shoes B and friction surfaces 17 of the casting A, the spreading action being exerted both directly by the wedges D and indirectly through the block E and shoes C. When the shoes B have reached their innermost limit, continued movement of the front follower 15 will force the wedges D rearwardly with respect to the shoes B. Due to the arrangement of wedge faces described, the said continued rearward movement of the wedges D will be accompanied by an inward lateral movement of the wedges D thereby creating friction between the wedges D and the follower 15 and also between the wedges D and the block E. The combined longitudinal and lateral movement of the wedges D will force the block E rearwardly at a higher rate than that of the wedges D so that the block E will cause the shoes C to travel rearwardly and create friction between the opposed friction surfaces of the shoes C and shoes B. The movement of the parts is limited finally by the engagement of the shoes C with the shoulders 19 and this will preferably occur when the outer faces of the wedges D become flush with the outer end of the casting A. By employing the anti-friction rollers K, it is evident that all danger of "sticking" of the parts will be overcome and consequently the release will be certain since the wedges D will be free to move outwardly with respect to the shoes B and the block E will similarly be free to move outwardly with respect to the shoes C and thereby release the friction between the sets of shoes and between the outer set of shoes B and friction shell.

In actual practice, where the permissible stroke of the mechanism is three inches, that is, where there is normally three inches clearance between the follower 15 and the outer end of the casting A, I will preferably so locate the shoulders 18 and 19 as to permit of a movement of approximately one and one-half inches of the shoes B, the remaining movement of the shoes C being approximately three inches with respect to the shoes B. As will be understood, these features may be changed to suit different conditions and the relative amount of movement of the shoes C with respect to the shoes B will be dependent upon the angles employed in the coöperating wedge faces of the shoes and wedges and block.

With the construction shown and described, it is evident that I obtain a graduated frictional resistance and high capacity with large areas of wearing friction surfaces. It will be noted, for instance, that no set of coöperating friction surfaces is in actual sliding action during the entire compressive stroke, but, on the contrary, each set of friction surfaces is in relative sliding action during approximately only one-half of the stroke, thereby prolonging the life of the parts. It will also be observed that all of the parts are of such design that they may be manufactured at comparatively small expense.

I claim:

1. In a friction shock absorbing mechanism, the combination with a friction shell and a spring resistance; of a set of friction shoes directly coöperable with said shell; a second set of friction shoes directly coöperable with said first set of shoes, said sets of shoes having coöperating friction surfaces extending parallel to the axis of the shell, both sets being located at the same end of the shell; and spreader means directly coöperable with both sets of shoes to force them outwardly against the shell.

2. In a friction shock absorbing mechanism, the combination with a friction shell and a spring resistance; of an outer set of friction shoes coöperable with the shell; an inner set of friction shoes slidable relatively to the outer set of shoes on the interior thereof and located at the same end of the shell; and spreader means directly coöperable with both sets of friction shoes.

3. In a friction shock absorbing mechanism, the combination with a friction shell and a spring resistance; of a set of friction shoes directly coöperable with said shell; a second set of friction shoes directly coöperable with said first set of shoes and relatively movable thereto during a part only of the compressive stroke; and spreader means coöperable with both sets of shoes to force them outwardly against the shell, said spreader means including, a pair of outer wedges and a central wedge block.

4. In a friction shock absorbing mechanism, the combination with a friction shell and a spring resistance, of a set of friction shoes directly coöperable with said shell; a second set of friction shoes directly coöperable with the first named set of shoes; spreader means co-acting with said sets of shoes; and means for limiting the movement of the first set of friction shoes relatively to the shell prior to the end of the compressive stroke, the second set of friction shoes being movable during the remainder of the stroke.

5. In a friction shock absorbing mechanism, the combination with a friction shell and a spring resistance; of an outer set of friction shoes having inner wedge faces; a pair of relatively laterally movable wedges coöperable with said shoes; a central wedge block coöperable with said wedges; and another set of friction shoes having wedge faces coöperable with said block.

6. In a friction shock absorbing mechanism, the combination with a friction shell having longitudinally extending interior friction surfaces and limiting shoulders at the inner ends of said surfaces; of a spring resistance; an outer set of friction shoes directly coöperable with said friction surfaces and limited in their inward movement with respect to the shell by said shoulders, said shoes having interior wedge faces; an outer pair of wedges coöperable with said friction shoes and relatively movable laterally; a central wedge block coöperable with said wedges; and an inner pair of friction shoes frictionally coöperable with said first named set of friction shoes and having wedge faces coöperable with said block.

7. In a friction shock absorbing mechanism, the combination with a friction shell having longitudinally extending interior friction surfaces and limiting shoulders at the inner ends of said surfaces; of a spring resistance; an outer set of friction shoes directly coöperable with said friction surfaces and limited in their inward movement with respect to the shell by said shoulders, said shoes having interior wedge faces; an outer pair of wedges coöperable with said friction shoes and relatively movable laterally; a central wedge block coöperable with said wedges; an inner pair of friction shoes frictionally coöperable with said first named set of friction shoes and having wedge faces coöperable with said block; and anti-friction rollers interposed between the wedge faces of the shoes and the opposed corresponding faces of the wedges and wedge block.

8. In a friction gear, the combination with a friction shell having interior longitudinally extending friction surfaces, said shell having limiting shoulders at the inner ends of said surfaces; of a follower movable relatively to the shell; a pair of wedges disposed on the inner side of said follower and having friction surfaces coöperable with the latter; an outer pair of friction shoes directly slidable upon said friction surfaces of the shell and limited to movement relatively thereto by said shoulders, said shoes and wedges having opposed wedge faces; anti-friction rollers interposed between said wedge faces; an inner pair of friction shoes frictionally coöperable with the interior faces of said first named friction shoes, said inner shoes having inner wedge faces; a spring resistance interposed between said inner friction shoes and the shell; a central wedge block having outer wedge faces frictionally coöperable with said wedges and provided also with inner wedge faces opposed to the wedge faces of the inner friction shoes; and anti-friction rollers interposed between the opposed wedge faces of said block and inner friction shoes.

In witness that I claim the foregoing I have hereunto subscribed my name this 5th day of Nov., 1919.

JOHN F. O'CONNOR.